US012586504B1

(12) United States Patent
Paolucci et al.

(10) Patent No.: US 12,586,504 B1

(45) Date of Patent: Mar. 24, 2026

(54) ADAPTIVE ZERO OUTPUT IMPEDANCE CONVERTER

(71) Applicant: Apple Inc., Cupertino, CA (US)

(72) Inventors: Jonathan D Paolucci, Santa Clara, CA (US); Yanhui Xie, Cupertino, CA (US); Nathan Y Tang, Oakland, CA (US); Bo Xu, Saratoga, CA (US); Jingdong Chen, San Jose, CA (US); Jason N Gomez, Campbell, CA (US); Kevin Ho, San Jose, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 18/897,533

(22) Filed: Sep. 26, 2024

(51) Int. Cl.
*G09G 3/20* (2006.01)

(52) U.S. Cl.
CPC ... *G09G 3/2003* (2013.01); *G09G 2320/0626* (2013.01); *G09G 2320/0666* (2013.01); *G09G 2330/021* (2013.01); *G09G 2330/04* (2013.01)

(58) Field of Classification Search
CPC ......... G09G 3/2003; G09G 2320/0626; G09G 2320/0666; G09G 2330/021; G09G 2330/04
See application file for complete search history.

(56) References Cited

U.S. PATENT DOCUMENTS 6,232,964 B1 * 5/2001 Lee .......................... G09G 1/16 345/212
12,174,651 B1 * 12/2024 Rattan ................. H03F 3/45192
2005/0110719 A1 5/2005 Satoh et al.
2006/0220597 A1 * 10/2006 Jung ........................ H04N 3/23 315/364
2012/0155133 A1 6/2012 Kim et al.
2016/0124478 A1 * 5/2016 Beeston .................... G06F 1/26 713/300
2019/0053337 A1 * 2/2019 Xie ........................ H05B 45/46
2020/0051474 A1 * 2/2020 Park ..................... G09G 3/3696
2020/0111398 A1 4/2020 Lee et al.
2022/0036828 A1 2/2022 Lee et al.
(Continued)

FOREIGN PATENT DOCUMENTS

CN 110136638 A 5/2019
CN 111429845 A 4/2020
(Continued)

*Primary Examiner* — Antonio Xavier

(74) *Attorney, Agent, or Firm* — FLETCHER YODER PC

(57) ABSTRACT

An adaptive power supply for a display system of an electronic device can include one or more switching devices; an output filter having an output configured to be coupled to a display panel of the display system via a power delivery network and an input; one or more energy storage components coupled between the switching devices and the input of the output filter; control circuitry that operates the one or more switching devices in conjunction with the one or more energy storage components to produce a regulated output voltage at the output of the output filter; compensation circuitry that receives a signal corresponding to an output current of the power supply and generates therefrom a current compensation signal that is combined with a voltage feedback signal sensed at the output of the output filter to increase the regulated output voltage responsive to an increase in the output current.

27 Claims, 5 Drawing Sheets

(56) References Cited

U.S. PATENT DOCUMENTS

| | | | | |
|---|---|---|---|---|
| 2023/0252926 | A1 * | 8/2023 | Hong | H02M 1/32<br>345/211 |
| 2023/0353053 | A1 | 11/2023 | Ramorini et al. | |
| 2025/0209950 | A1 * | 6/2025 | Oh | G09G 3/20 |

FOREIGN PATENT DOCUMENTS

| | | | |
|---|---|---|---|
| KR | 2014055087 | A | 10/2012 |
| KR | 2017003795 | A | 6/2015 |

* cited by examiner

ADAPTIVE ZERO OUTPUT IMPEDANCE CONVERTER

BACKGROUND

Display panels can be powered by power supplies via a power distribution network. The power distribution network can present impedances outside the regulation loop of the power supply that can cause voltage error at the display panel. Such voltage errors can lead to luminance (brightness) and/or chrominance (color) errors to appear on the display.

SUMMARY

Therefore, it may be desirable to provide compensation techniques to mitigate the above-described voltage errors.

A display system for an electronic device can include a display panel; a power supply including a power management integrated circuit and one or more external passive components; a filter coupled to the output of the power supply, the filter comprising an inductance and an associated parasitic resistance; and a power delivery network coupled between the filter and a power input of the display panel. The power management integrated circuit can include compensation circuitry that receives a signal corresponding to an output current of the power supply and generates therefrom a current compensation signal that is combined with a voltage feedback signal sensed between the filter and the power delivery network. The combined voltage feedback and current signal can be provided to control circuitry that generates drive signals for one or more switching devices that cooperate with the one or more external passive components to generate an output voltage for delivery to the display panel via the filter and power delivery network. The compensation signal can cause an increase in the output voltage responsive to an increase in the output current.

The compensation circuitry can include row shift circuitry that adjusts the current compensation signal responsive to a timing signal associated with the display panel. The row shift circuitry can adjust the current compensation signal by adjusting a gain of a current compensation loop responsive to the timing signal. The timing signal can be received from a display panel driver. The display panel can be an organic light emitting diode display panel. The display panel can be a liquid crystal display. The switching devices can be integrated with the power management integrated circuit. The signal corresponding to the output current of the power supply can be derived from an RC network coupled in parallel with the filter and having a time constant corresponding to a time constant of the filter. The signal corresponding to the output current of the power supply can be derived from an RC network coupled in parallel with the filter and having a time constant longer than a time constant of the filter. The power supply can include a multi-phase buck converter. The filter can include a ferrite bead.

An adaptive power supply for a display system of an electronic device can include one or more switching devices; an output filter having an output configured to be coupled to a display panel of the display system via a power delivery network and an input; one or more energy storage components coupled between the switching devices and the input of the output filter; control circuitry that operates the one or more switching devices in conjunction with the one or more energy storage components to produce a regulated output voltage at the output of the output filter; compensation circuitry that receives a signal corresponding to an output current of the power supply and generates therefrom a current compensation signal that is combined with a voltage feedback signal sensed at the output of the output filter to increase the regulated output voltage responsive to an increase in the output current.

The control circuitry and compensation circuitry can be part of a power management integrated circuit. The one or more switching devices can be part of the power management integrated circuit. The compensation circuitry can include row shift circuitry that adjusts the current compensation signal responsive to a timing signal associated with a display. The row shift circuitry can adjust the current compensation signal by adjusting a gain of a current compensation loop responsive to the timing signal. The timing signal can be received from a display driver. The signal corresponding to the output current of the power supply can be derived from an RC network coupled in parallel with the output filter and having a time constant corresponding to a time constant of the output filter. The signal corresponding to the output current of the power supply can be derived from an RC network coupled in parallel with the output filter and having a time constant longer than a time constant of the filter. The one or more switching devices and the one or more energy storage components can form a multi-stage buck converter. The output filter can include a ferrite bead.

A power management integrated circuit for an adaptive power supply of a display system of an electronic device can include control circuitry that operates one or more switching devices in conjunction with one or more energy storage components to produce a regulated output voltage downstream of an output filter connected to an output of the adaptive power supply; compensation circuitry that receives a signal corresponding to an output current of the adaptive power supply and generates therefrom a current compensation signal that is combined with a voltage feedback signal corresponding to the regulated output voltage to increase the regulated output voltage responsive to an increase in the output current.

The one or more switching devices are part of the power management integrated circuit. The compensation circuitry can include row shift circuitry that adjusts the current compensation signal responsive to a timing signal associated with a display. The row shift circuitry can adjust the current compensation signal by adjusting a gain of a current compensation loop responsive to the timing signal. The timing signal can be received from a display driver. The one or more switching devices can be operable with the one or more energy storage components to form a multi-stage buck converter.

DETAILED DESCRIPTION

Figure 1:
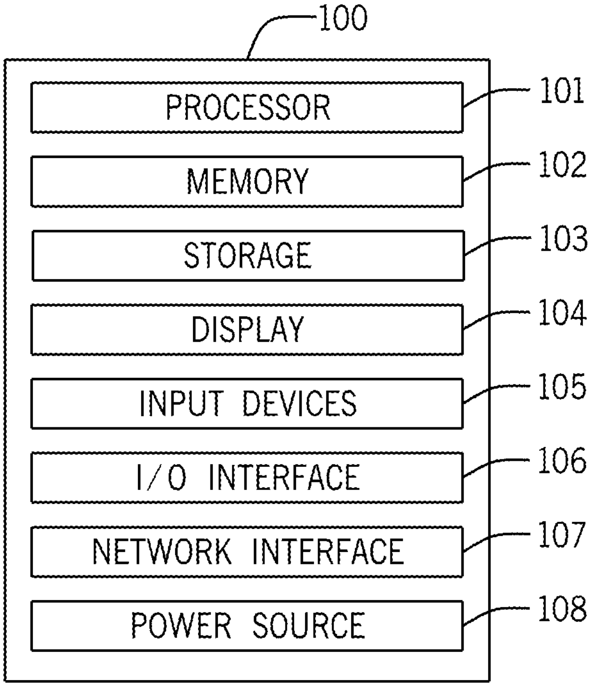
FIG. 1 illustrates a block diagram of an electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 is a block diagram of an electronic device 100, according to embodiments of the present disclosure. The electronic device 100 may include, among other things, one or more processors 101 (collectively referred to herein as a single processor for convenience, which may be implemented in any suitable form of processing circuitry), memory 102, nonvolatile storage 103, a display 104, input devices 105, an input/output (I/O) interface 106, a network interface 107, and a power system 108. The various functional blocks shown in FIG. 1 may include hardware elements (including circuitry), software elements (including machine-executable instructions), or a combination of both hardware and software elements (which may be referred to as logic). The processor 101, memory 102, the nonvolatile storage 103, the display 104, the input devices 105, the input/output (I/O) interface 106, the network interface 107, and/or the power system 108 may each be communicatively coupled directly or indirectly (e.g., through or via another component, a communication bus, a network, etc.) to one another to transmit and/or receive data amongst one another. It should be noted that FIG. 1 is merely one example of a particular implementation and is intended to illustrate the types of components that may be present in the electronic device 100.

By way of example, the electronic device 100 may include any suitable computing device, including a desktop or laptop/notebook, a portable electronic or handheld electronic device such as a wireless electronic device or smartphone, a tablet computer, a wearable electronic device such as a smart watch or head mounted display, and other similar devices.

Processor 101 and other related items in FIG. 1 may be embodied wholly hardware or by hardware programmed to execute suitable software instructions. Furthermore, the processor 101 and other related items in FIG. 1 may be a single contained processing module or may be incorporated wholly or partially within any of the other elements within the electronic device 100. Processor 101 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. Processor 101 may include one or more application processors, one or more baseband processors, or both, and perform the various functions described herein.

In the electronic device 100 of FIG. 1, processor 101 may be operably coupled with a memory 102 and a nonvolatile storage 103 to perform various algorithms. Such programs or instructions executed by processor 101 may be stored in any suitable article of manufacture that includes one or more tangible, computer-readable media. The tangible, computer-readable media may include the memory 102 and/or the nonvolatile storage 103, individually or collectively, to store the instructions or routines. The memory 102 and the nonvolatile storage 103 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by processor 101 to enable the electronic device 100 to provide various functionalities.

In certain embodiments, the display 104 may facilitate users to view images generated on the electronic device 100. In some embodiments, the display 104 may include a touch screen, which may facilitate user interaction with a user interface of the electronic device 100. Furthermore, it should be appreciated that, in some embodiments, the display 104 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input devices 105 of the electronic device 100 may enable a user to interact with the electronic device 100 (e.g., pressing a button to increase or decrease a volume level). The I/O interface 106 may enable the electronic device 100 to interface with various other electronic devices, as may the network interface 107. In some embodiments, the I/O interface 106 may include an I/O port for a hardwired connection for charging and/or content manipulation using a standard connector and protocol, such as a universal serial bus (USB), or other similar connector and protocol. The network interface 107 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a 6th generation (6G) or greater than 6G cellular network, a satellite network, a non-terrestrial network, and so on. In particular, the network interface 107 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 107 of the electronic device 100 may allow communication over the aforementioned networks (e.g., 5G, Wi-Fi, LTE-LAA, and so forth).

The network interface 107 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power system 108 of the electronic device 100 may include any suitable source of power, such as a rechargeable battery (e.g., a lithium ion or lithium polymer (Li-poly) battery) and/or a power converter, including a DC/DC power converter, an AC/DC power converter, a power adapter (which may be external), etc.

Figure 2:
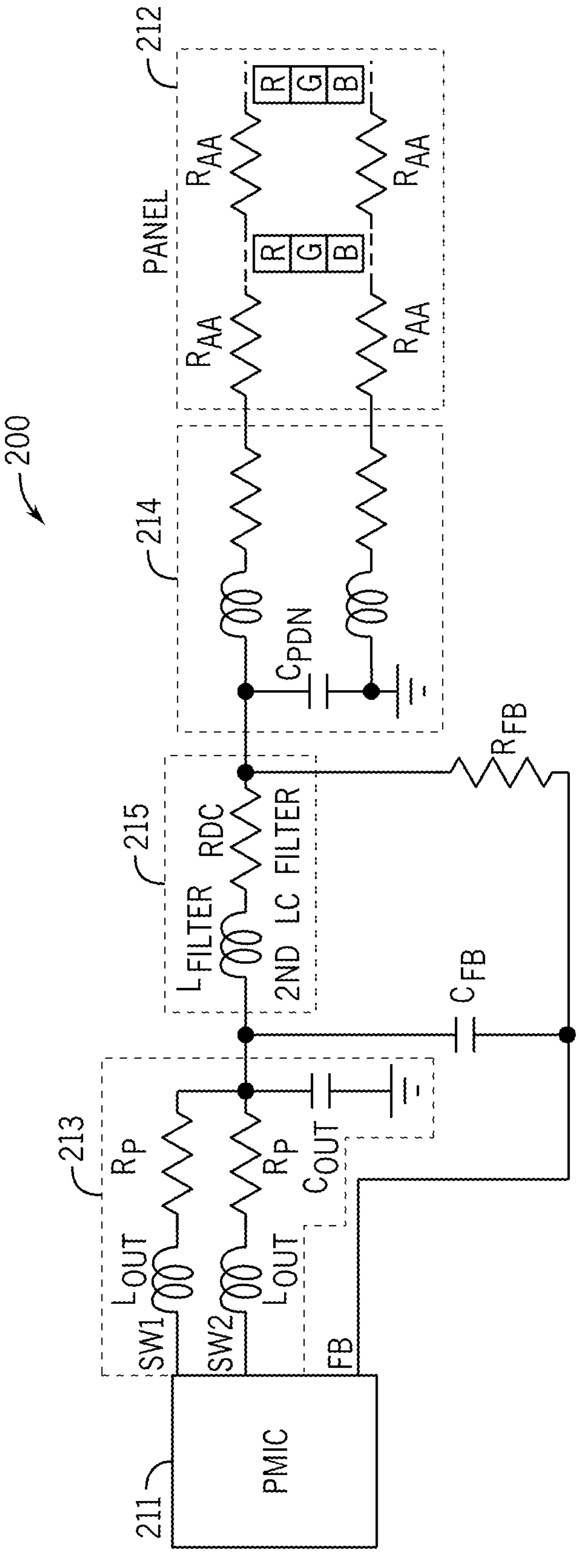
FIG. 2 illustrates a simplified schematic of a display system of an electronic device.

FIG. 2 illustrates a simplified schematic 200 of a display system of an electronic device. The display system can include a display panel 212, which can be an organic light emitting diode (OLED) display or other type of display, such as a liquid crystal display (LCD), micro-LED display, etc. Display panel 212 is depicted in the simplified schematic of FIG. 2 as an array of resistances RAA corresponding to the respective power distribution to the pixels/sub-pixels of the display panel, such as red, green, and blue sub-pixels, which represent the load presented to the power supply system, as described in greater detail below. Further details of the display construction are not material to the present disclosure, and thus are omitted for clarity and brevity.

Display panel 212 can be powered by a power supply system. The power supply system can include a power management integrated circuit ("PMIC") 211. As described in greater detail below, PMIC 211 can be used to implement a switching power supply, potentially in connection with external components 213. In various embodiments, different numbers and types of external components can be used depending on the type of switching power supply implemented. For example, the illustrated configuration can correspond to a multi-phase (e.g., two-phase) buck converter, although other converters types, such as multi-level (e.g., three-level) buck converters, boost converters, buck-boost converters, switched capacitor converters, charge pumps, etc., having differing numbers of phases could also be used as desired for various embodiments. In the example of FIG. 2, external components 213 include output inductors Lout for each phase of the two-phase buck converter, respectively connected to switching output terminals SW1 and SW2 of PMIC 211. Also depicted are parasitic resistances Rp associated with the inductors and an output capacitor Cout. PMIC 211 may contain the switching devices (e.g., switching half bridges for each phase of the multi-phase buck converter) that are operated by control circuitry, also contained within PMIC 211 to produce a regulated output voltage as described in greater detail below.

The power supply system (i.e., PMIC 211 and its associated external components) may be coupled to display panel 212 by an output filter 215 and a power delivery network 214. In the illustrated example, output filter 215 includes an inductor Lfilter (having a DC resistance Rdc) that acts as an LC filter in connection with the output capacitor Cout and/or the capacitance Cpdn of the power delivery network. Various filter types, such as ferrite beads, may be used, and the illustrated filter 215 is just one example. Power delivery network 214 can include any combination of wiring, wiring harnesses, printed circuit board traces, flexible printed circuits, etc. that are used to route power from the power supply system to the display panel 212. The power delivery network may have various capacitances, including a discrete filter capacitance Cpdn. There may also be additional parasitic impedances associated with the power delivery network, such as parasitic capacitances (much smaller than Cpdn, and thus ignored), parasitic inductances (modeled by the unlabeled inductors), and wire or trace resistances (modeled by the unlabeled resistances in power delivery network 214. The illustrated configuration is one model for analysis purpose, and these should be understood as lumped parameters to illustrate a physical implementation and not as discrete components included in a physical device.

As noted above, the power supply system delivers power to the display panel 212. Depending on what is being displayed on display panel 212 and/or how what is being displayed is changing, a significant amount of current may be drawn from the power supply system. These currents can cause voltage drops across the various system components described above, including the output filter 215 and the power delivery network 214. These voltage drops can alter the driving voltage actually supplied to panel 212, which can result in luminance and/or chrominance (brightness and/or color) errors in the display output. To mitigate these effects, it may be desirable to have the feedback signal source that regulates the output voltage of the power supply be taken closer to display panel 212. For example, the output side of output filter 215 may be coupled to a feedback terminal FB of PMIC 211 by feedback resistor RFB, which can allow the control circuitry within PMIC 211 to regulate the output voltage appearing at the output side of the filter, thus automatically compensating for any voltage drop caused by current flowing through the output filter. A feedback capacitor CFB may also be provided for purposes described in greater detail below.

Figure 3:
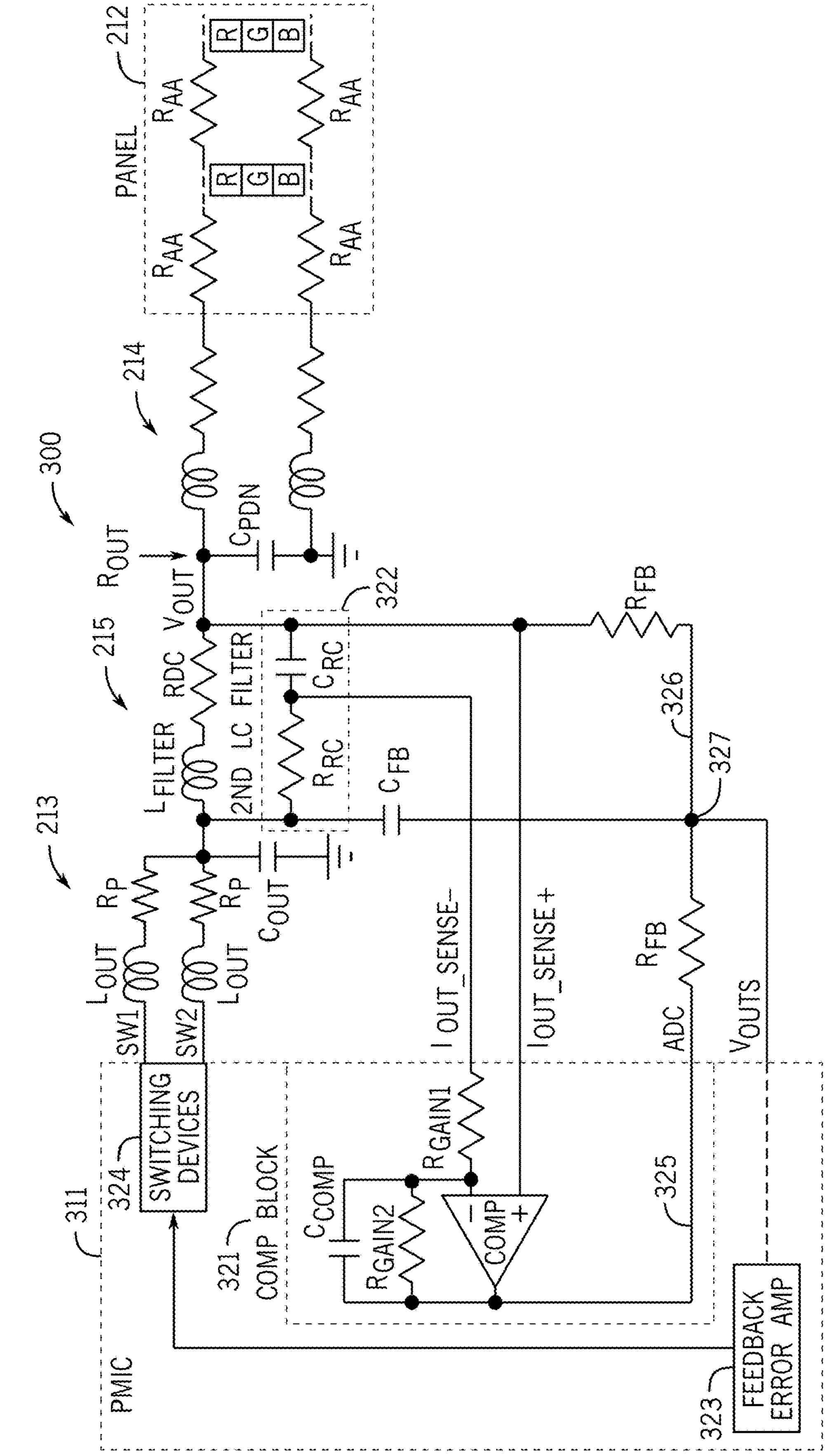
FIG. 3 illustrates a simplified schematic of a display system of an electronic device with adaptive output impedance control for voltage drop compensation.

Further voltage drop compensation may be provided as illustrated in FIG. 3, which illustrates a simplified schematic of a display system 300 having adaptive output impedance control for voltage drop compensation. FIG. 3 includes many of the same components described above with respect to FIG. 2 numbered with like reference numbers, and further illustrates additional components, including the internal control circuitry of PMIC 311 and modified feedback circuitry. As noted above, PMIC 311 may include switching devices 324 that are operated in conjunction with external power supply components 213 to implement a power supply. PMIC may also include internal control circuitry that operates the switching devices to produce a regulated output voltage Vout, measured at the output of output filter 215. Looking back toward the power supply from this point one sees an output resistance Rout, which may be adapted as described below to reduce voltage dips or other disruptions in Vout that can cause display errors. As described above, the output voltage Vout may be coupled to a feedback terminal of PMIC 311 via feedback resistor RFB to allow for regulation of the output voltage. In FIG. 3, this feedback terminal is labeled VOUTs. This feedback signal 326 (further modified by the output current compensation circuitry described in greater detail below) can be provided to a feedback error amplifier 323, which can in turn generate the drive signals for switching devices 324 (e.g., using PWM drive circuitry, switch drivers, etc. that are omitted for brevity and clarity). Feedback error amplifier 323 and the associated PWM drive circuitry and switch drivers may be implemented using any combination of analog, digital, and/or programmable circuitry (such as microcontrollers, microprocessors, etc.) to achieve the desired switching of the switching devices based on the received feedback signal.

An additional feedback signal, corresponding to the output current of the power supply, may also be provided to PMIC 311. For example, a current sensing circuit 322 may be disposed across the output filter 215, which is represented by filter inductance Lfilter and its DC resistance Rdc. It should be noted that this DC resistance is an inherent/parasitic property of the output filter inductor and not a discrete component; however, it can still be used as a sensing resistor for the output current by inclusion of current sensing block 322. Current sensing block 322 can include a resistor $R_{RC}$ and a capacitor $C_{RC}$ selected to have a time constant corresponding to the time constant of the LC circuit of output filter 215. In some cases, resistor $R_{RC}$ and a capacitor $C_{RC}$ can be selected to have a longer time constant, if lower bandwidth and greater noise immunity are desired. The resulting voltage across the sensing capacitor $C_{RC}$ can be provided to input terminals IOUT_SENSE+ and IOUT_SENSE− of PMIC 311. In other embodiments, other current sensing arrangements, such as shunt resistors, Hall effect sensors, etc. could be used. In any case, the output current signal can be provided to a compensation block 321 within PMIC. Compensation block 321 is illustrated as an equivalent compensation error amplifier in an integrating configuration with its gain set by the ratio of resistors RGAIN2 and RGAIN1, and its integration time set by the time constant of capacitor CCOMP and the corresponding resistance. However, other implementations of the compensation block using any suitable combination of analog, digital, and/or programmable circuitry could be provided. Likewise, the compensation circuit need not be an integrating circuit, although such configurations may be advantageous in some applications.

The output of compensation block 321, which can be a current compensation signal 325 corresponding to the output current of the converter, may be combined with the voltage feedback signal 326 to cause the power supply to produce an output voltage Vout that increases with output current, thereby offsetting or mitigating any effects of voltage drop across the output filter. This, in effect, changes the output impedance Rout of the combined power supply and output filter to be adaptive to load conditions. More specifically, the current compensation signal 325 can be provided at an output terminal ADC of PMIC 311, where it can be combined with the voltage feedback signal 326 via feedback resistor RFB at summing junction 327, which is effectively an input terminal of feedback error amplifier 323. Alternatively, current compensation signal 325 could be directly provided to feedback error amplifier 323 internally to PMIC 311. Corresponding control strategies could also be implemented with alternative analog, digital, and/or programmable control circuitry. Additionally, by having equal feedback resistances RFB in the feedback paths of the voltage feedback signal 326 and the current compensation 325, the signals can be equally weighted. In some embodiments, different values could be used to increase or decrease the relative strength or effectiveness of the voltage feedback signal 326 and/or the current compensation signal 325. Similarly, the gain of compensation block 321 could also be adjusted to increase or decrease the effect and influence of the current compensation signal on the output voltage Vout.

Analysis of the circuitry of FIG. 3 will show that the output resistance ROUT is negative and given by:

$$R_{out} = -0.5R_{dc} \cdot \frac{R_{GAIN2}}{R_{GAIN1}}$$

Setting ROUT equal or approximately equal to the parasitic resistance outside the power supply feedback loop can cancel all or at least much of the out of loop resistance.

Figure 4:
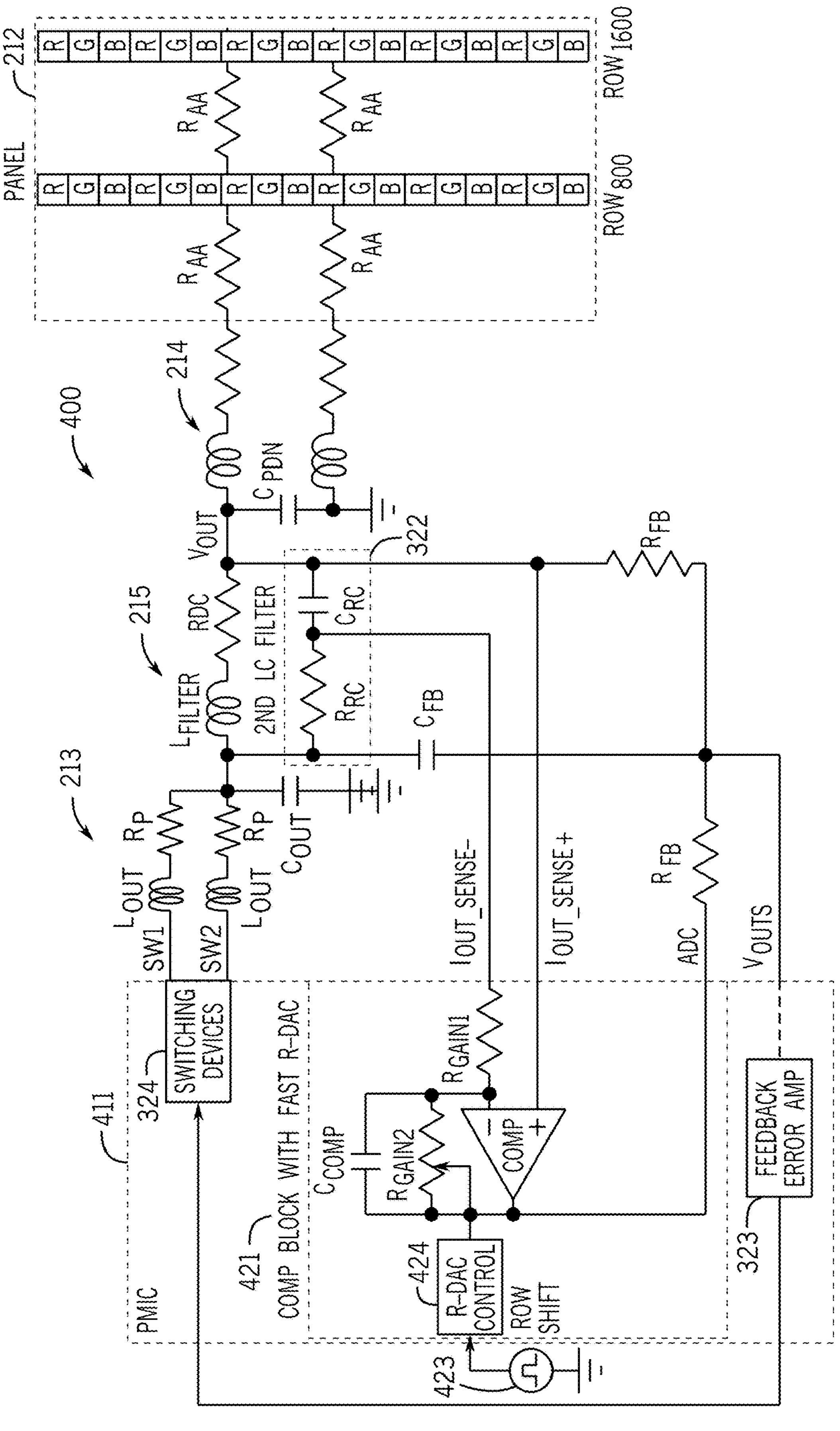
FIG. 4 illustrates a simplified schematic of a display system of an electronic device with adaptive output impedance control for voltage drop compensation that operates on a row-by-row basis.

Further voltage drop compensation may be provided as illustrated in FIG. 4, which illustrates a simplified schematic of a display system 400 having further adaptive output impedance control for voltage drop compensation in that the adaptation can change with each driven row of display panel 212. FIG. 4 includes many of the same components described above with respect to FIGS. 2 and 3 numbered with like reference numbers, and further illustrates additional components, including further internal control circuitry of PMIC 411. As noted above, PMIC 411 may include switching devices 324 that are operated in conjunction with external power supply components 213 to implement a power supply. PMIC may also include internal control circuitry that operates the switching devices to produce a regulated output voltage Vout, measured at the output of output filter 215. As a modification to the circuitry above, compensation block 421, which can in most respects correspond to compensation block 321 described above may also adapt the compensation signal on a row-by-row basis as respective rows of display panel 212 are driven. To that end, a row shift clock 423, which can be provided by the display driver circuit (not shown) can be supplied to R-DAC control circuitry 424 of the compensation block. This circuitry can be used to adjust feedback resistor RGAIN2 of the current compensation block on a row-by-row basis. This can allow a system implementer to adjust the output current compensation applied as each row of the display panel is driven. This can be used to account for different impedances associated with driving each row of the display. The differing RGAIN2 resistance values to be employed can be determined using any suitable technique, such as empirical testing during the design phase. The RGAIN2 variable resistance can be implemented using various techniques, such a bank of resistors with values allowing for switched selection, programmable resistors, etc. Additionally, R-DAC control circuitry can be implemented in a variety of ways, such as a look up table, etc. In any case, the net control effect to be achieved is to allow the current compensation to change as each row of the display is driven to minimize output voltage (VOUT) dips or other disruptions to reduce display error of display panel 212.

To summarize, the effective resistance can respond to programmed row changes, as rows of the display are progressively scanned. The negative resistance gain can be adjusted such that the instantaneous negative resistance generated by compensation block 421 cancels at least a significant portion of the resistance to the display row being currently scanned. This R-DAC control could be over an SPI interface between the display driver and the PMIC 411 or could be controlled via state-machine control and a row shift clock to sequentially shift effective negative resistance by an incremental amount. Other control circuitry implementations of this control strategy could also be employed.

Figure 5:
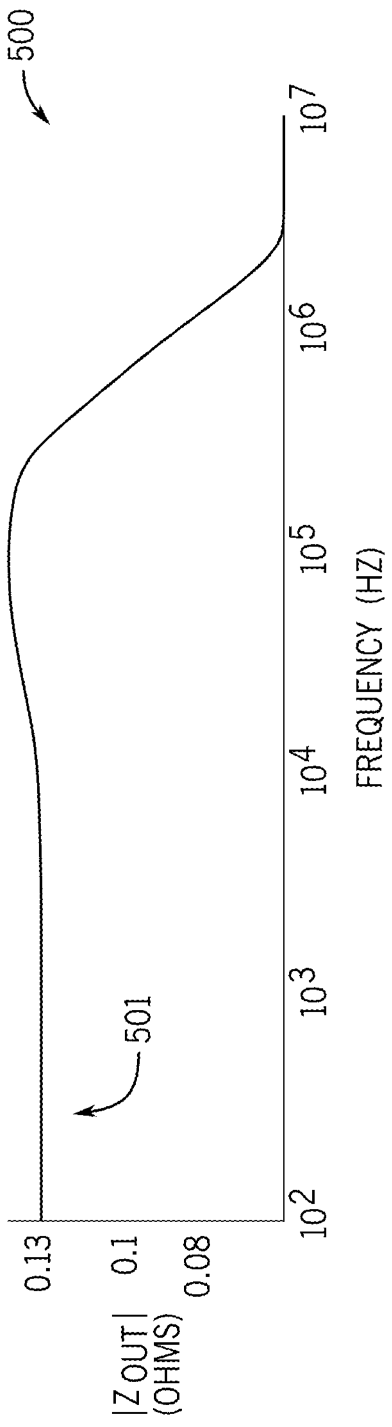
FIG. 5 illustrates an example transfer characteristic of a display system of an electronic device.

FIG. 5 illustrates an example transfer characteristic 500 of a power supply and power distribution network for a display system of an electronic device without the output current compensation circuitry as described herein. This is but one example, and other systems may exhibit different specific characteristics, but the basic nature of the transfer characteristics will remain the same. More specifically, the illustrated transfer characteristic is a curve 501 plotting the effective output impedance magnitude of the power supply system (ZOUT), corresponding to the output resistance identified in FIGS. 3 and 4 above. As can be seen, in the region corresponding to typical display frequencies, e.g., 100 Hz to 1000 Hz, the system exhibits a relatively high impedance (as compared to FIG. 6 below) on the order of about 0.13 ohms. Again, this is merely one representative value, and this number could vary from one embodiment to another.

Figure 6:
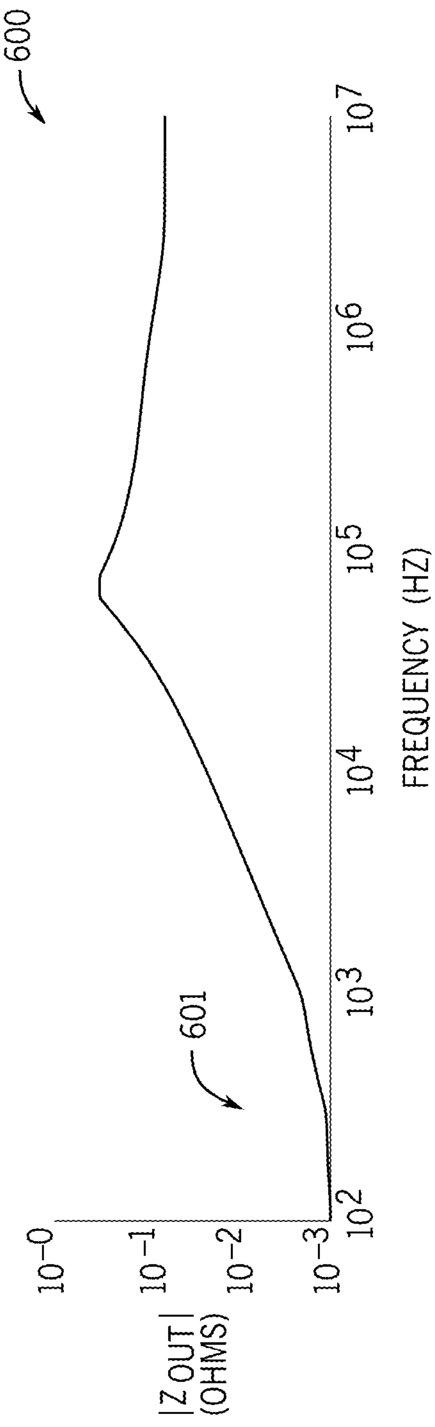
FIG. 6 illustrates an example transfer characteristic of a display system of an electronic device incorporating adaptive output impedance control for voltage drop compensation.

FIG. 6 illustrates an example transfer characteristic 600 of a power supply and power distribution network for a display system of an electronic device incorporating adaptive output impedance control for voltage drop compensation. This, too, is but one example, and other systems may exhibit different specific characteristics, but the basic nature of the transfer characteristics will remain the same. More specifically, the illustrated transfer characteristic is a curve 601 plotting the effective output impedance magnitude of the power supply system (ZOUT), corresponding to the output resistance identified in FIGS. 3 and 4 above. As can be seen, in the region corresponding to typical display frequencies, e.g., 100 Hz to 1000 Hz, the system exhibits a somewhat lower impedance (as compared to FIG. 5 above) on the order milliohms. Although an increase is expected as operating frequency increases, the end result is a much lower effective impedance at operating frequencies of interest, thus resulting in decreased voltage drop as seen by the display panel, which can reduce luminance and/or chrominance errors associated with the load current drawn by the display. Again, this is merely one representative curve, and the specific impedance values could vary from one embodiment to another.

The foregoing describes exemplary embodiments of power supply circuitry for display systems with adaptive output impedance compensation. Such configurations may be used in a variety of applications but may be particularly advantageous when used in conjunction with electronic devices such as desktop or notebook computers, smartphones, smartwatches, tablet computers, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A display system for an electronic device, the display system comprising:
- a display panel;
- a power supply including a power management integrated circuit and one or more external passive components;
- a filter coupled to the output of the power supply, the filter comprising an inductance and an associated parasitic resistance; and
- a power delivery network coupled between the filter and a power input of the display panel;
- wherein:
  - the power management integrated circuit includes compensation circuitry that receives a signal corresponding to an output current of the power supply and generates therefrom a current compensation signal that is combined with a voltage feedback signal sensed between the filter and the power delivery network; and
  - the combined voltage feedback and current signal is provided to control circuitry that generates drive signals for one or more switching devices that cooperate with the one or more external passive components to generate an output voltage for delivery to the display panel via the filter and power delivery network; and
  - the compensation signal causes an increase in the output voltage responsive to an increase in the output current.

2. The display system of claim 1 wherein the compensation circuitry comprises row shift circuitry that adjusts the current compensation signal responsive to a timing signal associated with the display panel.

3. The display system of claim 2 wherein the row shift circuitry adjusts the current compensation signal by adjusting a gain of a current compensation loop responsive to the timing signal.

4. The display system of claim 2 wherein the timing signal is received from a display panel driver.

5. The display system of claim 1 wherein the display panel is an organic light emitting diode display panel.

6. The display system of claim 1 wherein the display panel is a liquid crystal display.

7. The display system of claim 1 wherein the switching devices are integrated with the power management integrated circuit.

8. The display system of claim 1 wherein the signal corresponding to the output current of the power supply is derived from an RC network coupled in parallel with the filter and having a time constant corresponding to a time constant of the filter.

9. The display system of claim 1 wherein the signal corresponding to the output current of the power supply is derived from an RC network coupled in parallel with the filter and having a time constant longer than a time constant of the filter.

10. The display system of claim 1 wherein the power supply includes a multi-phase buck converter.

11. The display system of claim 1 wherein the filter comprises a ferrite bead.

12. An adaptive power supply for a display system of an electronic device, the adaptive power supply comprising:
- one or more switching devices;
- an output filter having an output configured to be coupled to a display panel of the display system via a power delivery network and an input;
- one or more energy storage components coupled between the switching devices and the input of the output filter;

control circuitry that operates the one or more switching devices in conjunction with the one or more energy storage components to produce a regulated output voltage at the output of the output filter; and compensation circuitry that receives a signal corresponding to an output current of the power supply and generates therefrom a current compensation signal that is combined with a voltage feedback signal sensed at the output of the output filter to increase the regulated output voltage responsive to an increase in the output current.

13. The adaptive power supply of claim 12 wherein the control circuitry and compensation circuitry are part of a power management integrated circuit.

14. The adaptive power supply of claim 13 wherein the one or more switching devices are part of the power management integrated circuit.

15. The adaptive power supply of claim 12 wherein the compensation circuitry comprises row shift circuitry that adjusts the current compensation signal responsive to a timing signal associated with a display.

16. The adaptive power supply of claim 15 wherein the row shift circuitry adjusts the current compensation signal by adjusting a gain of a current compensation loop responsive to the timing signal.

17. The adaptive power supply of claim 15 wherein the timing signal is received from a display driver.

18. The adaptive power supply of claim 12 wherein the signal corresponding to the output current of the power supply is derived from an RC network coupled in parallel with the output filter and having a time constant corresponding to a time constant of the output filter.

19. The adaptive power supply of claim 12 wherein the signal corresponding to the output current of the power supply is derived from an RC network coupled in parallel with the output filter and having a time constant longer than a time constant of the filter.

20. The adaptive power supply of claim 12 wherein the one or more switching devices and the one or more energy storage components form a multi-stage buck converter.

21. The adaptive power supply of claim 12 wherein the output filter comprises a ferrite bead.

22. A power management integrated circuit for an adaptive power supply of a display system of an electronic device, the power management integrated circuit comprising:

control circuitry that operates one or more switching devices in conjunction with one or more energy storage components to produce a regulated output voltage downstream of an output filter connected to an output of the adaptive power supply; and compensation circuitry that receives a signal corresponding to an output current of the adaptive power supply and generates therefrom a current compensation signal that is combined with a voltage feedback signal corresponding to the regulated output voltage to increase the regulated output voltage responsive to an increase in the output current.

23. The power management integrated circuit of claim 22 wherein the one or more switching devices are part of the power management integrated circuit.

24. The power management integrated circuit of claim 22 wherein the compensation circuitry comprises row shift circuitry that adjusts the current compensation signal responsive to a timing signal associated with a display.

25. The power management integrated circuit of claim 24 wherein the row shift circuitry adjusts the current compensation signal by adjusting a gain of a current compensation loop responsive to the timing signal.

26. The power management integrated circuit of claim 24 wherein the timing signal is received from a display driver.

27. The power management integrated circuit of claim 22 wherein the one or more switching devices are operable with the one or more energy storage components to form a multi-stage buck converter.

* * * * *